(12) United States Patent
Chang (10) Patent No.: US 6,519,685 B1
(45) Date of Patent: Feb. 11, 2003

(54) CACHE STATES FOR MULTIPROCESSOR CACHE COHERENCY PROTOCOLS

(75) Inventor: Stephen S. Chang, Glendora, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,274

(22) Filed: Dec. 22, 1999

(51) Int. Cl.⁷ .............................................. G06F 12/00
(52) U.S. Cl. ...................... 711/141; 711/120; 711/156
(58) Field of Search ................................ 711/122, 141, 711/144, 156, 120, 145; 709/1

(56) References Cited

U.S. PATENT DOCUMENTS

| | | | | |
|---|---|---|---|---|
| 5,524,233 A | * | 6/1996 | Milburn et al. | 711/141 |
| 5,551,005 A | * | 8/1996 | Sarangdhar et al. | 711/145 |
| 5,706,463 A | * | 1/1998 | Ebrahim et al. | 711/120 |
| 5,715,428 A | * | 2/1998 | Wang et al. | 711/141 |
| 5,796,977 A | * | 8/1998 | Sarangdhar et al. | 709/1 |
| 5,809,536 A | * | 9/1998 | Young et al. | 711/144 |
| 5,848,434 A | * | 12/1998 | Young et al. | 711/144 |
| 5,860,120 A | * | 1/1999 | Young et al. | 711/156 |
| 5,943,684 A | * | 8/1999 | Arimilli et al. | 711/144 |
| 5,987,571 A | * | 11/1999 | Shibata et al. | 711/141 |
| 6,073,211 A | * | 6/2000 | Cheng et al. | 711/122 |
| 6,192,451 B1 | * | 2/2001 | Arimilli et al. | 711/141 |

* cited by examiner

*Primary Examiner*—David Hudspeth
*Assistant Examiner*—Fred F. Tzeng
(74) *Attorney, Agent, or Firm*—Schwegman, Lundberg, Woessner & Kluth, P.A.

(57) ABSTRACT

Cache states for cache coherency protocols for a multiprocessor system are described. Some embodiments described include a multiprocessor computer system comprising a plurality of cache memories to store a plurality of cache lines and state information for each one of the cache lines. The state information comprises data representing a first state selected from the group consisting of a Shared-Update state, a Shared-Respond state and an Exclusive-Respond state. The multiprocessor computer system further comprises a plurality of processors with at least one cache memory associated with each one of the plurality of processors. The multiprocessor computer system further comprises a system memory shared by the plurality of processors, and at least one bus interconnecting the system memory with the plurality of cache memories and the multiple processors. In some embodiments, one or more of the states (a Shared-Update state, a Shared-Respond state or an Exclusive-Respond state) are implemented in conjunction with the states of the MESI protocol.

16 Claims, 7 Drawing Sheets

| Processor Cycle | Cache State = Shared | Cache State = Shared-Update |
|---|---|---|
| Read Miss | Generate Read on system bus. Update cache and mark status as Shared. | Generate Read-Shared on system bus. Update cache and mark status as Shared-Update |
| Read Hit | Read cache data, no status change. | Read cache data, no status change. |
| Write Miss | Generate Write on system bus, no status change. (Write-Through)<br><br>Generate Read-and-Invalidate on system bus Update cache and mark status as Modified. All other agents invalidate the same cache line. (Write-Back) | Generate Write on system bus, no status change. (Write-Through)<br><br>Generate Read-and-Invalidate on system bus Update cache and mark status as Modified. All other agents invalidate the same cache line. (Write-Back) |
| Write Hit | Generate Write on system bus, no status change. (Write-Through)<br><br>Generate Read-and-Invalidate system bus. Update cache and mark status as Modified. (Write-Back) | Generate Write on system bus, no status change. Update main memory and other agents with the same cache line. |

FIG. 1

| Processor Cycle | Cache State = Shared | Cache State = Shared-Update |
|---|---|---|
| Read Miss | Generate Read on system bus. Update cache and mark status as Shared. | Generate Read-Shared on system bus. Update cache and mark status as Shared-Update |
| Read Hit | Read cache data, no status change. | Read cache data, no status change. |
| Write Miss | Generate Write on system bus, no status change. (Write-Through)<br><br>Generate Read-and-Invalidate on system bus. Update cache and mark status as Modified. All other agents invalidate the same cache line. (Write-Back) | Generate Write on system bus, no status change. (Write-Through)<br><br>Generate Read-and-Invalidate on system bus Update cache and mark status as Modified. All other agents invalidate the same cache line. (Write-Back) |
| Write Hit | Generate Write on system bus, no status change. (Write-Through)<br><br>Generate Read-and-Invalidate system bus. Update cache and mark status as Modified. (Write-Back) | Generate Write on system bus, no status change. Update main memory and other agents with the same cache line. |

FIG. 2A

| System Bus Cycle | Cache State = Shared | Cache State = Shared-Update |
|---|---|---|
| Read | Generate Shared snoop response, no status change. | Generate Shared snoop response, no status change. |
| Read-and-Invalidate | No snoop response. Mark cache status as Invalid. | No snoop response. Mark cache status as Invalid. |
| Write | No snoop resonse. Mark cache status as Invalid. Processor must generate Read cycle to reacquire the updated cache line. | No snoop response. Update cache with the new data, no status change. |

FIG. 2B

| System Bus Cycle | Cache State = Exclusive | Cache State = Shared-Respond | Cache State = Shared | Cache State = Shared-Temp |
|---|---|---|---|---|
| Read | Generate Shared snoop response, Mark cache status as Shared-Respond. | Generate Shared snoop response, no status change. | No snoop response, no status change. | No snoop response, Mark cache status as Shared. |
| Read-and-Invalidate | No snoop response. Mark cache status as Invalid. | No snoop response. Mark cache status as Invalid. | No snoop response. Mark cache status as Invalid. | No snoop response. Mark cache status as Invalid. |
| Write | No snoop response. Mark cache status as Invalid. | No snoop response. Mark cache status as Invalid. | No snoop response. Mark cache status as Invalid. | No snoop response. Mark cache status as Invalid. |
| Shared-Respond Eviction | Not Possible. | No snoop response. Mark cache status as Invalid. | No snoop response. Mark cache status as Shared-Temp. | Not Possible. |
| Shared-Respond Claim | Not Possible. | Not Possible. | Not Possible. | No snoop response. Mark cache status as Shared. |

| Time | Event on Time Line | Action taken by Caching Agent 1 | State of Caching Agent 1's cache line | State of cache line in other caches |
|---|---|---|---|---|
| 1 | Caching Agent 1 performs memory read | Update line from main memory | Exclusive | Cache line not found in other caches |
| 2 | Caching Agent 2 performs memory read | Drive a Shared Snoop Response signal | Shared Respond | Shared |
| 3 | Caching Agent 3 performs memory read | Drive a shared Snoop Response signal | Shared Respond | Shared |
| 4 | Caching Agent 1 evicts cache line | Issue a bus cycle to indicate the eviction of the cache line | Invalid | Shared Temp |
| 5 | Caching Agents 2 and 3 content for shared respond state | No action | Invalid | Shared Temp |
| 6 | Caching Agent 2 "wins" | No action | Invalid | Shared Respond for Caching Agent 2; Shared for Caching Agent 3 |

CACHE STATES FOR MULTIPROCESSOR CACHE COHERENCY PROTOCOLS

FIELD OF THE INVENTION

The present invention is related to multiprocessor computer systems, and more particularly to cache coherency protocols for multiprocessor computer systems.

BACKGROUND INFORMATION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, LCD, etc.

In some computer systems multiple processors are utilized. This use of multiple processors allows various tasks or functions to be handled by other than a single CPU so that the computing power of the overall system is enhanced. Theoretically, a computer system with "n" processors can perform "n" times as many tasks and therefore can be "n" times faster than a computer with a single processor. However, in order to use multiple processors, the most recent version of data needs to be locatable and each processor needs to be provided with the most recent data when the data is needed to perform a task. This is referred to as "data coherency."

The multiple processors often contain a small amount of dedicated memory referred to as a cache or a cache memory. Caches are used to increase the speed of operation. In a processor having a cache, when information is called from main memory and used by the processor, the same information and its main memory address are also stored in the cache memory. The cache memory usually is a static random access memory (SRAM). As each new read or write command is issued, the system looks to the cache memory to see if the information exists. A comparison is made between a desired memory address and the memory addresses in the cache memory. If one of the addresses in the cache memory matches the desired address, then there is a "hit" (i.e., the information is available in the cache). The information is then accessed from the cache rather than from main memory so that access to main memory is not required. Thus, the command is processed much more rapidly. If the information is not available in the cache, the new data is copied from the main memory and stored in the cache for future use.

In any system employing a cache memory, and particularly in a system employing multiple cache memories, data from a given memory location can reside simultaneously in main memory and in one or more cache memories. However, the data in main memory and in cache memory may not always be the same. This may occur when a processor updates the data contained in its associated cache memory without updating the main memory and other cache memories, or when another bus master changes data in main memory without updating its copy in the processor cache memories. A bus master is any device that can read or write commands into main memory.

Cache coherency is the term given to the problem of assuring that the contents of a cache memory and those of main memory for all caches in a multiple cache system are either identical or under tight enough control that stale and current data are not confused with each other. Cache coherency is also sometimes referred to as cache consistency or cache currency.

A cache coherency protocol is a method by which caches, processors, main memory, and alternate bus masters communicate with each other. The cache coherency protocol assures that the computer system maintains agreement between data stored in main memory and data stored in the caches on the same bus. In other words, the cache coherency protocol is used by a computer system to track data moving between the processors, main memory, and the various cache memories.

One such cache coherency protocol is referred to as the "MESI" protocol. According to the MESI protocol, four states are assigned to the data elements within the cache: modified, exclusive, shared, or invalid. The MESI protocol ensures that all references to a main-memory location retrieve the most recent value. However, main memory bandwidth is often limited in a multiprocessor system and may create a bottleneck; and the MESI protocol does not minimize the number of main-memory accesses. Thus, with a traditional MESI protocol, opportunities are missed to use a copy of data in one of the caches to avoid a main-memory access or to reduce the number of main-memory accesses.

For these and other reasons, there is a need for the present invention.

SUMMARY OF THE INVENTION

Some embodiments of the invention include a multiprocessor computer system comprising a plurality of cache memories to store a plurality of cache lines and state information for each one of the cache lines. The state information comprises data representing a first state selected from the group consisting of a Shared-Update state, a Shared-Respond state and an Exclusive-Respond state. The multiprocessor computer system further comprises a plurality of processors with at least one cache memory associated with each one of the plurality of processors. The multiprocessor computer system further comprises a system memory shared by the plurality of processors, and at least one bus interconnecting the system memory with the plurality of cache memories and the plurality of processors.

Still other embodiments, aspects and advantages of the invention will become apparent by reference to the drawings and by reading the following detailed description.

DESCRIPTION OF THE PREFERRED EMBODIMENTS

Embodiments of cache coherency protocols for a multi-processor system are described in detail below. In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

As used herein, the phrase "some embodiments" refers to at least some embodiments of the invention. The various appearances of "some embodiments" are not necessarily referring to the same embodiments. If the specification states a component, feature, structure, or characteristic "may," "might," or "could" be included, that particular component, feature, structure, or characteristic is not required to be included. Reference in the specification to "an embodiment" or "one embodiment" means that a particular feature, structure, or characteristic described in connection with the embodiment is included in at least some embodiments, but not necessarily all embodiments, of the invention.

In the following detailed description, a number of terms are used to describe certain characteristics of components within some embodiments of a computer system. These terms are not mutually exclusive. A "requesting agent" is the agent initiating a request typically to read or write data. A "responding agent" is an agent responding to the request by providing data. A "caching agent" is an agent having cache capabilities such as a processor. A "snooping agent" is an agent that snoops its internal memory for data requests by a bus transaction. The snooping agent is normally one of the caching agents.

SYSTEM OVERVIEW

Figure 1:
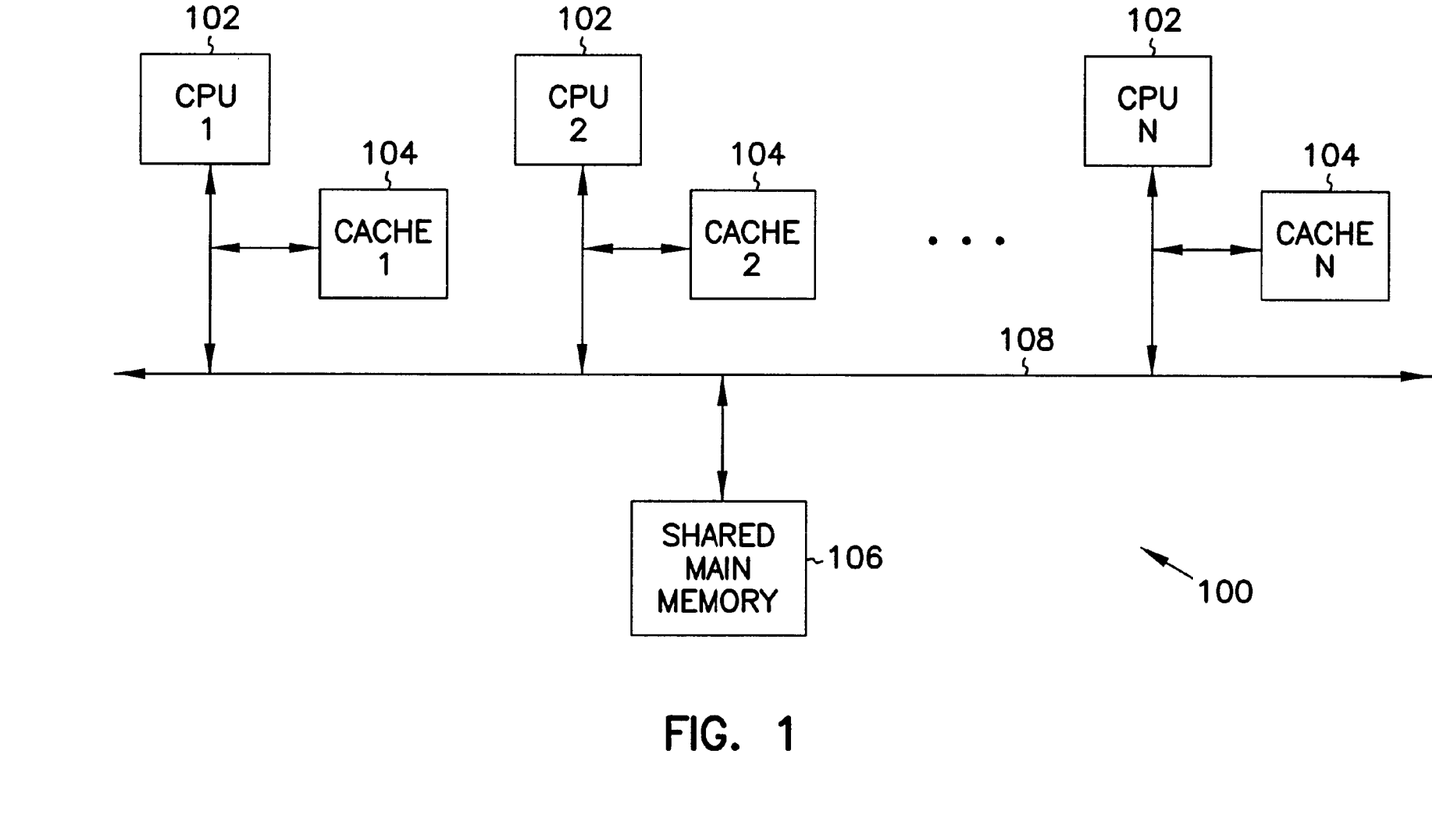
FIG. 1 is a block diagram of a typical hardware and operating environment in conjunction with which embodiments of the invention may be implemented.

FIG. 1 is a diagram of a typical hardware and operating environment in conjunction with which embodiments of the invention may be implemented. In many computer systems, a processor is coupled to an internal or external cache, and to an external memory device over a high speed memory bus. The example computer system 100 shown in FIG. 1 comprises a plurality of processors 102. Each one of the processors is coupled to a cache memory 104. At least one bus 108 interconnects the shared main memory 106 with the plurality of cache memories 104 and the multiple processors 102. When data is read from the shared main memory 106 and used by one of the processors 102, the data and its main memory address are also stored in the processor's cache memory 104. Data from a given main memory location can reside simultaneously in main memory 106 and in one or more cache memories 104. Also, the data from a given main memory location found in one cache memory 104 may have a value different from that in the main memory 106 because one has been updated more recently.

When a caching agent (such as a processor 102), also referred to in this context as a requesting agent, initiates a transaction request with the main memory 106, the other caching agents (referred to as snooping agents) may monitor, or "snoop," the transaction. This is because a cache memory 104 holds a subset of data elements from the main memory 106 that may be altered by the transaction. During the snooping process, the snooping agent searches its cache (such as cache memory 104) for the data element requested by the requesting agent.

A caching agent maintains coherency by using one of several protocols. One such protocol is a write-through protocol, where a write cycle always writes through to memory, so that the memory always has the latest copy of the data element. Another protocol is a write-back protocol. The write-back protocol is a deferred writing process where each data element in the cache is assigned an invalid, exclusive, or modified state. The modified state indicates that the data element within the cache is "dirty," or different from (more up to date than) the copy stored in the memory. The exclusive state indicates that the data element within the cache is "clean," or the same as the copy stored in the memory. The invalid state indicates that the data element in the cache has been deallocated. Another embodiment of a deferred writing protocol is sometimes referred to as the "MESI" protocol, where four states are assigned to the data elements within the cache: modified, exclusive, shared, or invalid.

CACHE STATE DEFINITIONS FOR MESI PROTOCOL

The MESI cache coherency protocol is a hardware-implemented protocol for maintaining data consistency between main memory and cache memories. A typical implementation of the MESI hardware cache coherency protocol requires the utilization of cache controllers having the ability to: a) use the same line size for all caches on the memory bus; b) observe all activity on the memory bus; c) maintain state information for every line of cache memory; and d) take appropriate action to maintain data consistency within the cache memories and main memory.

The MESI protocol is implemented by assigning state bits for each cached line. These states are dependent upon both data transfer activities performed by the local processor as the bus master and snooping activities performed in response to transactions generated by other bus masters.

MESI represents four states that are defined as follows.

Modified. This state indicates a line of data that is exclusively available in only this cache (this data in all other caches is invalid), and is modified (i.e. main memory's copy is stale). Modified data has been acted upon by a processor. A Modified line can be read or updated locally in the cache without acquiring the shared memory bus. If some other device in the system requires this line, the owning cache must supply the data.

Exclusive. This state indicates a line of data which is exclusively available in only this cache (this data in all other caches is invalid). This line of data is not Modified (main memory also has a valid copy), and that the local processor has the freedom to modify this line without informing the system. Exclusive data cannot be used by any other processor until it is acted upon in some manner. Writing to an Exclusive line causes the line to change to the Modified state and can be done without informing other caches or memory, so no memory bus activity is generated. According to the traditional MESI implementation, on a snoop for a data element in an Exclusive state, it is the responsibility of the main memory to provide the data element. In contrast, an Exclusive-Respond state of one embodiment of the present invention eliminates this main memory access as will be further described below.

Shared. This state indicates a line of data that is potentially shared with other caches. In other words, the same line may exist in one or more caches (main memory also has a valid copy). Shared data may be shared among multiple processors and stored in multiple caches. A Shared line can be read by the local processor without a main memory access. When a processor writes to a line locally marked Shared, it broadcasts the write to the main memory as well. However, according to one embodiment of the present invention, a Shared-Update state eliminates the memory read cycles which would otherwise be required for the caching agents to acquire the new copy of the cache line from the main memory after the processor writes to the cache line.

Invalid. This state indicates a line of data is not available in the cache. Invalid data in a particular cache is not to be used for future processing, except diagnostic or similar uses. A read to this line will be a "miss" (not available). A write to this line will cause a write-through cycle to the memory bus.

MESI ensures that all references to a main-memory location retrieve the most recent value. However, MESI does not minimize the number of main-memory accesses. With a traditional MESI protocol, opportunities are missed to use a copy of data in one of the caches to avoid a main memory access or to reduce the number of main memory accesses. Embodiments of novel states for cache coherency protocols are described in the next section.

CACHE STATE DEFINITIONS FOR CACHE COHERENCY PROTOCOLS ACCORDING TO

Embodiments of the Invention

Some embodiments of the present invention reduce the main memory reads and writes (bus transactions) by implementing a cache coherency protocol incorporating one or more of the new cache states described below.

Shared-Update. According to one embodiment of the present invention, a novel cache coherency protocol includes a Shared-Update state. Like the Shared state of the MESI protocol, the Shared-Update state indicates that one or more caching agents have a valid copy of the same cache line of data. However, unlike the Shared state of the MESI protocol, when a cache line in the Shared-Update state is written to, all caching agents with this cache line update the cache line from the data on the system bus during an external memory write cycle.

In operation, a caching agent performing a memory read marks the associated cache line in the Shared-Update state. All caching agents with a cache line in the Shared-Update state "listen" to the system bus. If any of the caching agents write to a cache line in the Shared-Update state (i.e., a write hit), an external memory write cycle is generated. All of the caching agents with the same cache line in the Shared-Update state update their internal cache during the external memory write cycle to reflect the most recent copy of the cache line. The cache line remains in the Shared-Update state in each cache after the cache line is updated. The Shared-Update state eliminates the memory read cycles that would otherwise be required for the caching agents to get the new copy of the cache line from the main memory as required by the Shared state of the MESI protocol. In this way, a caching agent's cache line in the Shared-Update state maintains the most recent copy the data element without generating additional memory read cycles.

In some embodiments in which the system bus is pipelined, a snooping agent has an outstanding request buffer which contains requests that have gone out to the bus, but for which the transaction has not completed. The snooping agent also has an outgoing buffer to hold the requests that are about to go out to the system bus. The outgoing buffer and outstanding requests buffer of a snooping agent are snooped during an external memory write cycle. Any request dependent on a cache line in the Shared-Update state is corrected when the cache line is updated by the external memory write cycle. For example, an outgoing write cycle due to an Increment instruction is required to abort and read the new data from its internal cache before the correct value for the write cycle can be reevaluated.

According to one embodiment of the invention, the Shared-Update state is implemented in place of the Shared state in the MESI protocol. Implementing the Shared-Update state instead of the Shared state improves system performance over the conventional MESI protocol. According to the conventional MESI protocol, a Shared copy of a cache line is invalidated by a memory write cycle or by a read-and-invalidate cycle. Then, according to the conventional MESI protocol, the caching agents must reacquire the invalid cache line by generating memory read cycles. However, according to one embodiment of the present invention, the Shared-Update state causes all caching agents to "listen" to the bus so that when an external memory write cycle occurs, the caching agents update their cache. This eliminates the memory read cycles that would otherwise be required to acquire the new copy of the cache line from the memory and, as a result, improves system performance.

Figure 2A:
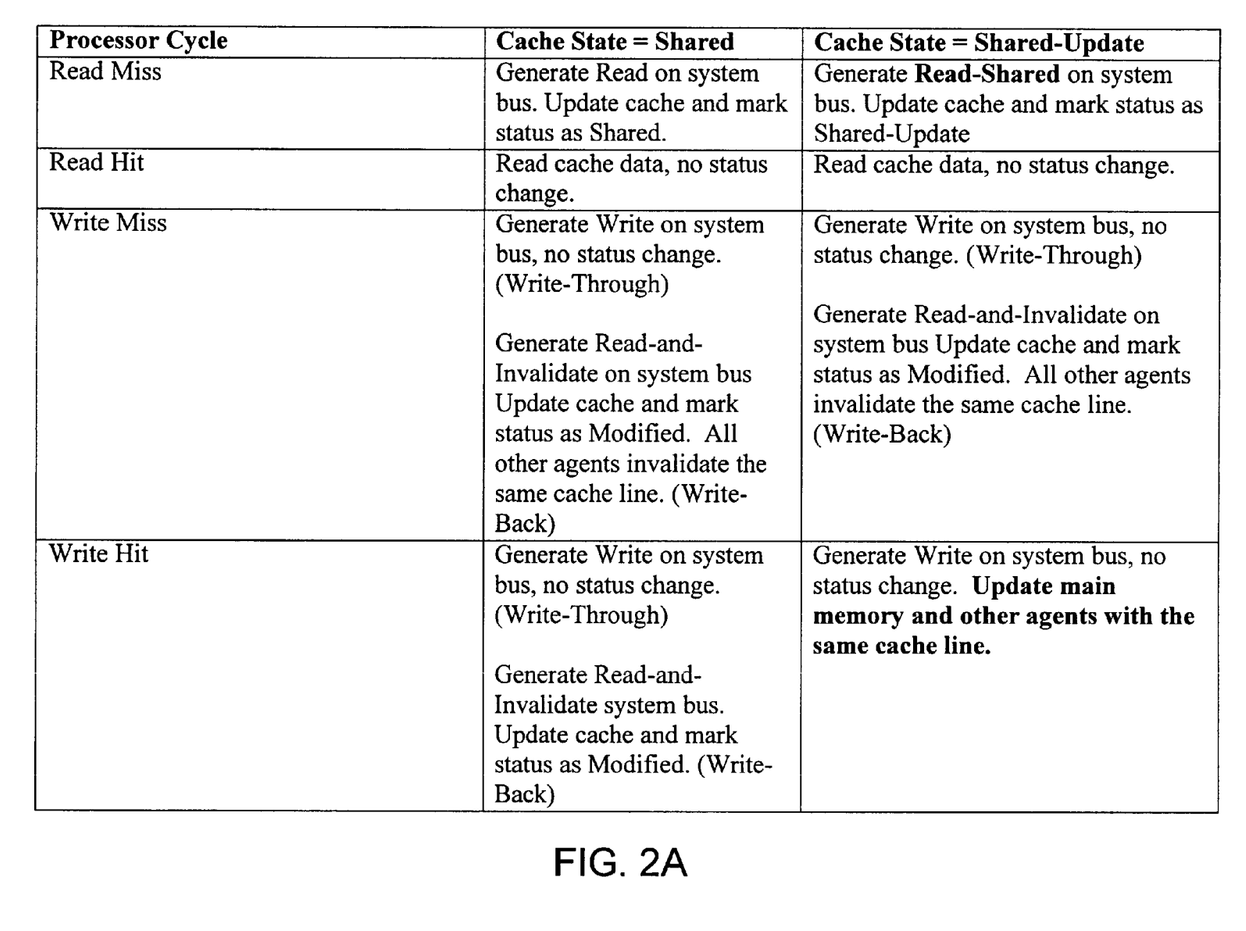
FIGS. 2A and 2B are tables comparing the MESI Shared state with the Shared-Update state of one embodiment of the present invention.
Figure 2B:
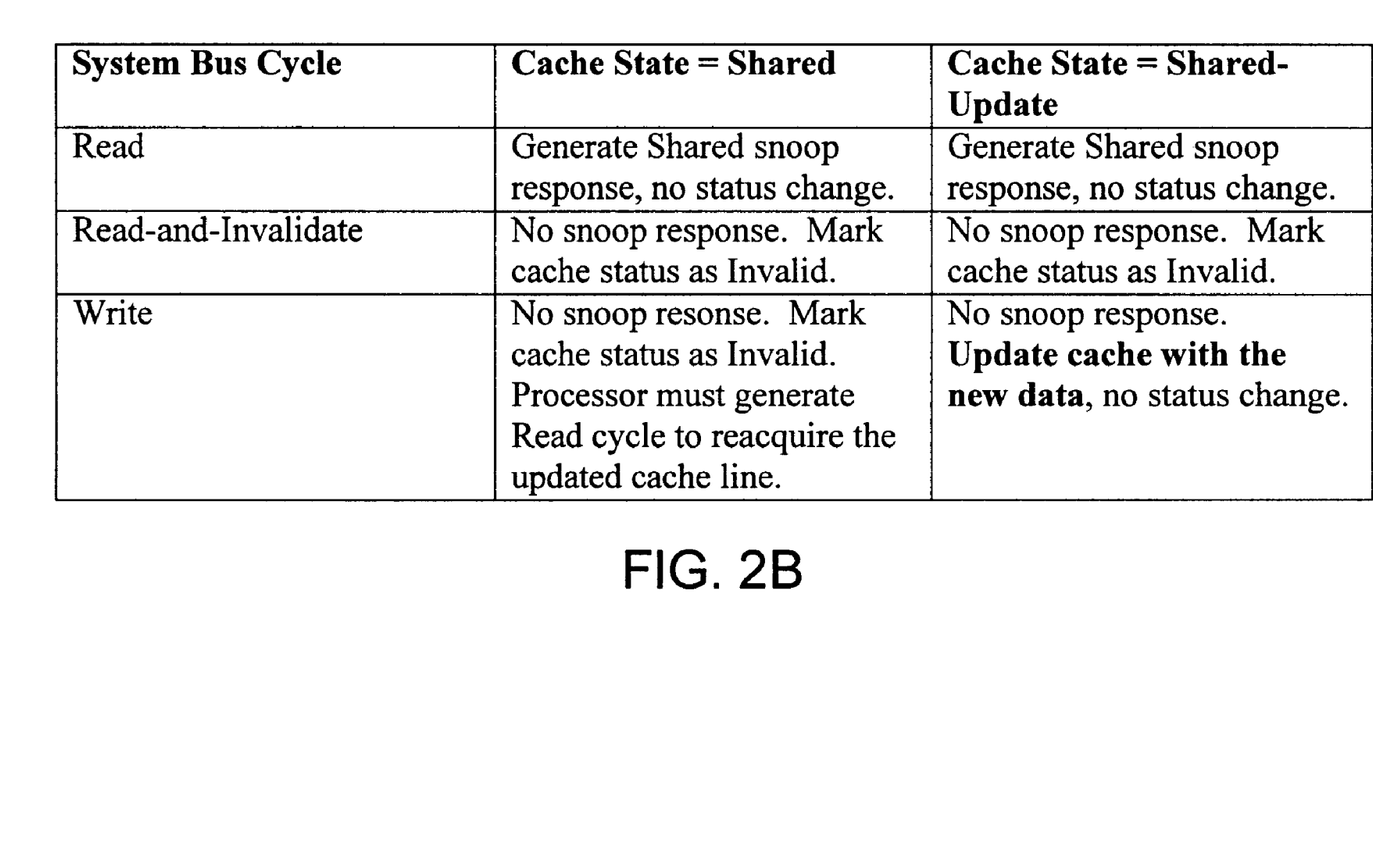

FIGS. 2A and 2B are tables comparing the conventional Shared state of the MESI protocol with the Shared-Update state of a cache coherency protocol according to one embodiment of the invention. FIG. 2A is a table comparing the actions taken by a processor when performing read and write operations. The column labeled "Cache State=Shared" summarizes the actions of a processor implementing a MESI protocol with a cache line in a conventional Shared state. The column labeled "Cache State=Shared-Update" summarizes the actions of a processor implementing a cache coherency protocol with a cache line in a Shared-Update state according to one embodiment of the invention. As shown in FIG. 2A, after a Read Miss by a processor to its local cache, the data element is read from the main memory and stored in the local cache. According to one embodiment of the Shared-Update state, the cache line status in the local cache is marked as "Shared-Update." Also, according to one embodiment of the Shared-Update state and as indicated in FIG. 2A, when a Write Hit by a processor to its local cache occurs, the main memory is updated and the same cache line in the other caching agents is updated while the main memory is being updated.

FIG. 2B is a table comparing the actions taken by a processor as a snooping agent in response to the system bus cycles listed in the first column. Again, the column labeled "Cache State=Shared" summarizes the actions of a processor implementing a MESI protocol with a cache line in a conventional Shared state. The column labeled "Cache State=Shared-Update" summarizes the actions of a processor implementing a cache coherency protocol with a cache line in a Shared-Update state according to one embodiment of the invention. According to one embodiment of the Shared-Update state and as indicated in FIG. 2B, when a system bus Write cycle occurs and a data element being updated is present in a cache memory of a snooping agent, the data element in the cache memory of the snooping agent is updated using the data on the system bus for the memory write cycle. In one embodiment also shown in FIG. 2B, a cache line remains in the Shared-Update state until a memory Read-and-Invalidate cycle explicitly invalidates all shared copies of the cache line.

Shared-Respond. According to another embodiment of the present invention, a novel cache coherency protocol includes a Shared-Respond state. In one embodiment, the Shared-Respond state is implemented together with the Shared state of the MESI protocol.

In an example embodiment of a cache coherency protocol having a Shared-Respond state, multiple caching agents may have a copy of the same cache line in a Shared state, but only one of the multiple caching agents marks the copy of the cache line with the Shared-Respond state. According to one embodiment of the present invention, the caching agent with the cache line in the Shared-Respond state is responsible for driving out a Shared Snoop Response signal. All other caching agents with the same cache line in the Shared state do not participate in driving the snoop response.

In one embodiment, a snoop response occurs during a Snoop Phase of a bus transaction. Generally during the Snoop Phase, the results of snoops performed by any caching agents on the system bus are asserted. In previous systems during the Snoop Phase, a first signal was asserted by each caching agent having the requested data in a Shared or Exclusive state (defined above in the MESI protocol description) to indicate to the requesting agent that the requested data should be entered into the requesting agent's cache in a Shared state. This signal is referred to herein as a "Shared Snoop Response." An "Exclusive Snoop Response" signal is asserted when a caching agent performs a memory read and no other caching agents have a valid copy of the requested data. An "Exclusive Snoop Response" signal indicates to the requesting agent that the requested data should be entered into the requesting agent's cache in an Exclusive state.

In an example embodiment of the present invention, when a first caching agent performs a memory read and gets an "Exclusive Snoop Response," the first caching agent will mark the cache line as Exclusive in its cache. If the cache line is not modified and a second caching agent performs a memory read, the first caching agent will respond with a "Shared Snoop Response." This will cause the first caching agent to change the cache line from an Exclusive state to a Shared-Respond state. The Share-Respond state requires that the first caching agent drive out a Shared Snoop Response when a second caching agent is reading the same cache line. According to one embodiment of the invention, all caching agents that receive the Shared Snoop Response mark their tags with the Shared state which means that the caching agents are not to participate in driving the Shared Snoop Response.

In one embodiment, since the first caching agent with the Shared-Respond state "owns" the driving of the snoop response, the agent is required to issue a bus cycle to indicate an eviction of the cache line. The bus cycle to indicate the eviction causes the caching agents with the cache line marked Shared to temporarily change the state of the cache line from Shared to "Shared-Temp". The Shared-Temp state causes the caching agents with a cache line in this state to compete to issue a zero length read bus cycle for the cache line. The first caching agent that successfully issues the read bus cycle "wins" and changes the cache line state from Shared-Temp to Shared-Respond in its cache. All other caching agents change the cache line state from Shared-Temp back to Shared. In this way, the new Shared-Respond cache state limits the driving of the snoop response to only one caching agent.

In the event that a bus cycle to indicate the eviction of a cache line "hits" a read request for the same cache line in a caching agent's outgoing buffer when ownership of the Shared-Respond has not yet been determined, the caching agent changes the Read request in its outgoing buffer to a Read-Shared request. When the read request is issued, the caching agent marks the cache line in the Shared-Respond state if no other caching agent has claimed ownership of the Shared-Respond state. Otherwise, the caching agent marks the cache line in the Shared state if a shared snoop response was received (i.e another caching agent has claimed ownership of the Shared-Respond state). In one embodiment, the depth of the outgoing buffer must account for the worst case delay between the eviction indication and the claim of ownership of the Shared-Respond.

Figure 3:
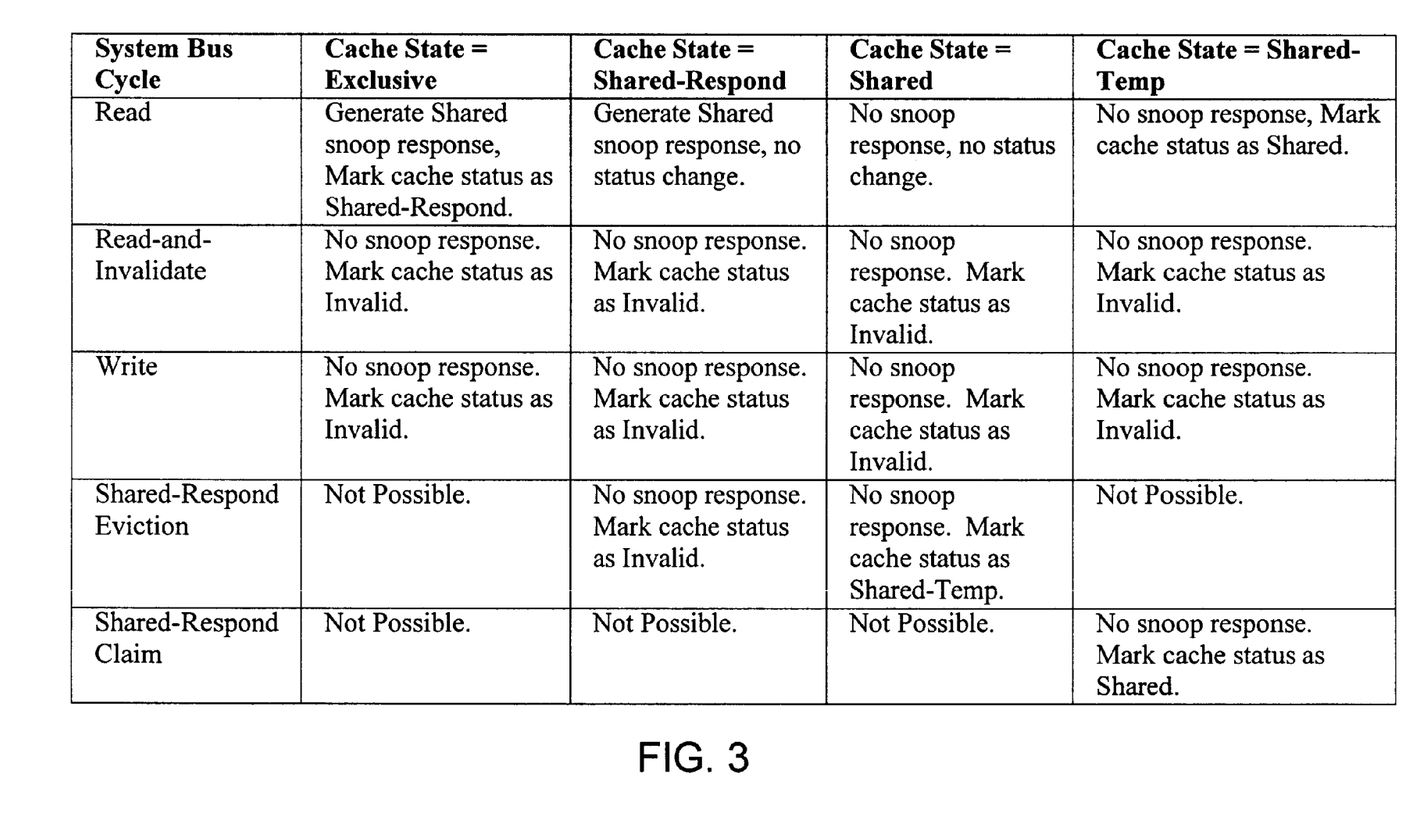
FIG. 3 is a table summarizing the action taken when a caching agent has a cache line in the Exclusive state, Shared-Respond state, Shared state or Shared-Temp state according to one embodiment of the present invention.

FIG. 3 is a table summarizing the actions taken by a processor as a snooping agent in response to the system bus cycles listed in the first column. For example, the first row of the table in FIG. 3 summarizes the actions of a processor as snooping agent in response to a Read system bus cycle. If a processor has a cache line in an Exclusive state and the processor detects a Read system bus cycle for the cache line, the processor generates a Shared Snoop Response and changes the status of its copy of the cache line from the Exclusive State to a Shared-Respond state according to one embodiment of the invention. Then, if the processor with the cache line in the Shared-Respond state detects a Read system bus cycle for the cache line, the processor again generates a Shared Snoop Response and leaves the state of its copy of the cache line in the Shared-Respond state. In contrast, if a processor has a cache line in a Shared state and the processor detects a Read system bus cycle for the cache line, the processor does not generates a Snoop Response because only the processor with the cache line in the Shared-Respond state drives the snoop response. If a processor has a cache line in a Shared-Temp state and the processor detects a Read system bus cycle for the cache line, the processor returns the state of its copy of the cache line to the Shared state and the processor does not participate in driving the snoop response.

As indicated in the second row of the table in FIG. 3, a processor does not generate a snoop response when a Read-and-Invalidate system bus cycle is detected. Likewise, a processor does not generate a snoop response when a Write system bus cycle is detected as shown in the third row of the table in FIG. 3. As shown in the fourth row of the table in FIG. 3, when a processor has a cache line in a Shared state and the processor detects a Shared-Respond Eviction system bus cycle, the processor changes the state of the cache line to Shared-Temp. Then, when the processor with the cache line in the Shared-Temp state detects a Shared-Respond-Claim system bus cycle, the processor returns the state of the cache line to Shared as shown in the fifth row of the table in FIG. 3.

The new Shared-Respond cache state confines the driving of the Shared snoop response to one caching agent and, as a result, eliminates the simultaneous driving and releasing of the Shared snoop response by multiple caching agents. This allows the removal of the required dead clock for settling simultaneously driven snoop response signals (wired-OR), and simplifies the snoop response protocol requirements.

Figure 4A:
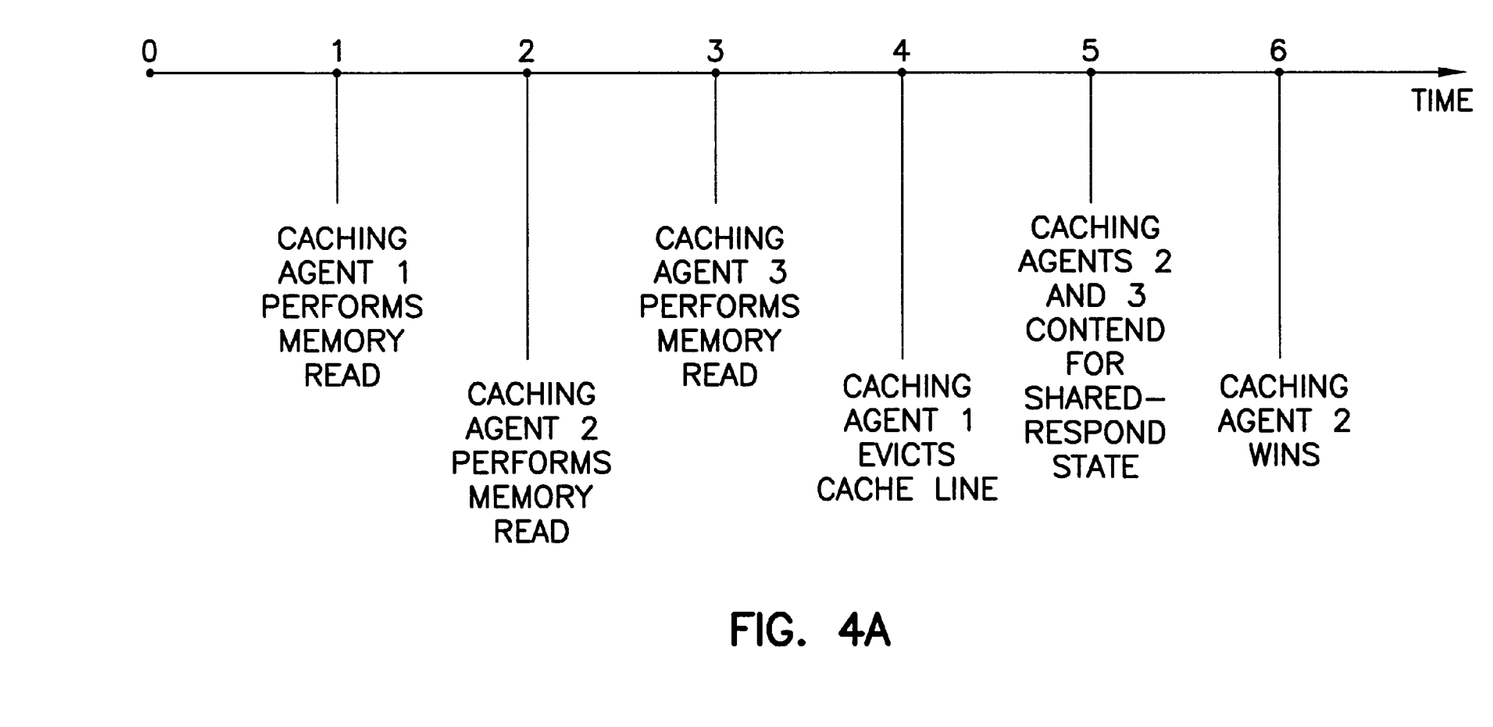
FIG. 4A is a time line showing actions taken by example caching agents using the Shared-Respond state of one embodiment of the present invention.
Figure 4B:
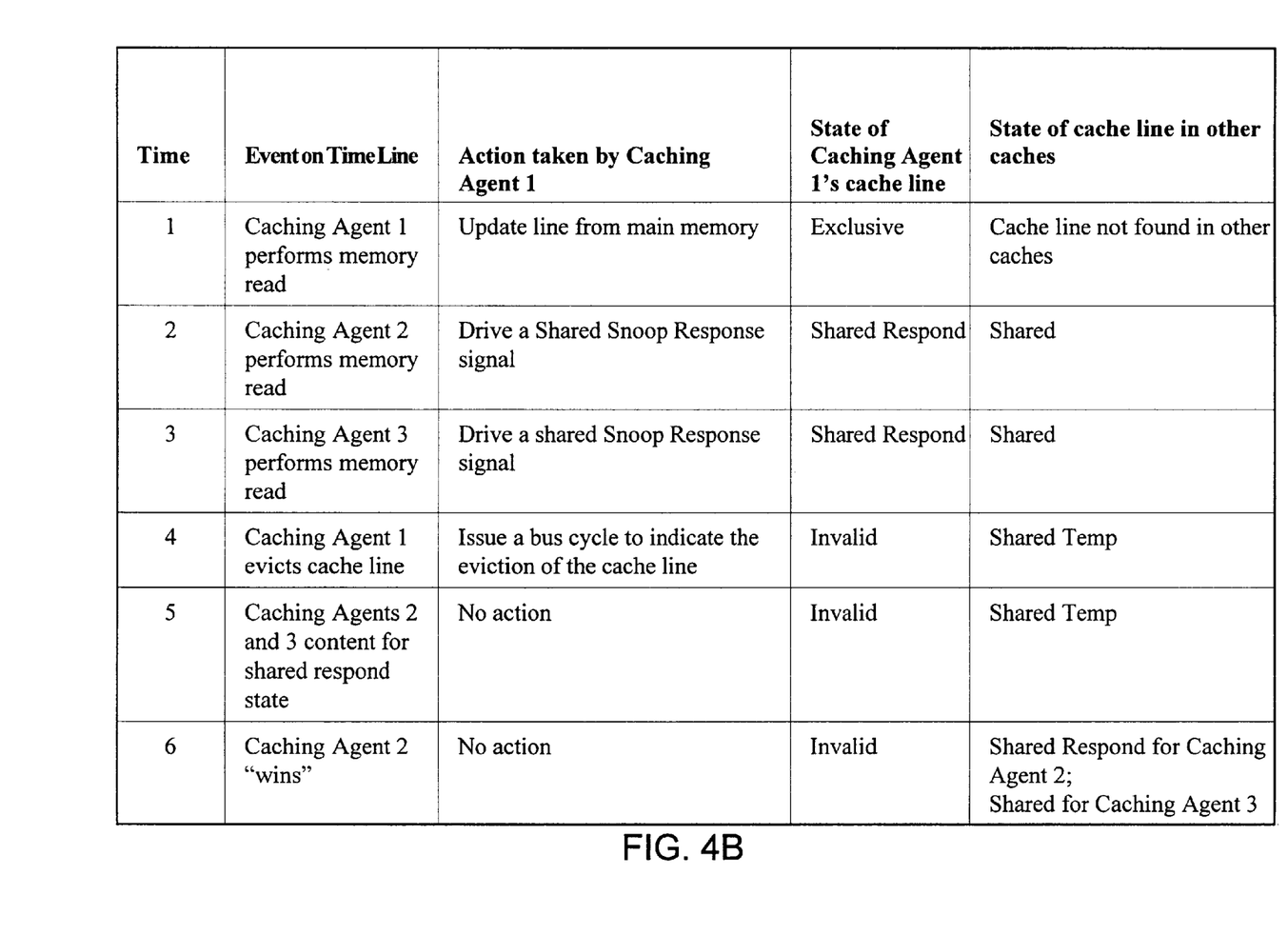
FIG. 4B is a table that corresponds to and further explains the time line shown in FIG. 4A.

FIGS. 4A and 4B illustrate an example embodiment of the present invention using the Shared-Respond state. FIG. 4A is a time line showing actions taken by example caching agents. FIG. 4B is a table that corresponds to the time line shown in FIG. 4A. The entries in the table of FIG. 4B further explain the entries on the time line in FIG. 4A.

At time "1" on the time line of FIG. 4A, a first caching agent (Caching Agent 1) performs a memory read operation and receives an Exclusive Snoop Response. As indicated in FIG. 4B, Caching Agent 1 reads the line from main memory and marks the cache line as Exclusive. The Exclusive Snoop Response indicates that a valid copy of the cache line is not found in the other caches.

At time "2" on the time line of FIG. 4A, a second caching agent (Caching Agent 2) performs a memory read operation. Because the cache line in Caching Agent 1 is not modified, Caching Agent 1 responds with a Shared Snoop Response. As indicated in the table of FIG. 4B, Caching Agent 1 changes the state of the cache line from Exclusive to the Shared-Respond state of one embodiment of the present invention. The cache line in Caching Agent 2 is marked with the Shared state. In one embodiment, the Shared state corresponds to the Shared state of the MESI protocol.

At time "3" on the time line of FIG. 4A, a third caching agent (Caching Agent 3) performs a memory read operation. Because the cache line in Caching Agent 1 in still not modified and because the cache line in Caching Agent 1 is marked with the Shared-Respond state, only Caching Agent 1 responds with a Shared Snoop Response. Caching Agent 2 does not drive a snoop response. As shown in the table of FIG. 4B, the cache line in Caching Agent 1 remains in the Shared-Respond state. The cache lines of Caching Agent 2 and Caching Agent 3 are marked with the Shared state.

At time "4" on the time line of FIG. 4A, the cache line is removed from Caching Agent 1 (i.e., evicted). Caching Agent 1 issues a bus cycle to indicate the eviction of the cache line. As shown in FIG. 4B, the state of the cache line in Caching Agent 1 is marked Invalid and the state of the cache line in Caching Agent 2 and Caching Agent 3 is changed from Shared to Shared-Temp according to one embodiment of the present invention.

At time "5" on the time line of FIG. 4A, Caching Agents 2 and 3 contend for the Shared-Respond state. At time "6" Caching Agent 2 "wins" the Shared-Respond state. As described earlier, the first caching agent with a cache line in the Shared-Temp state to issue a read bus cycle changes its cache line state from Shared-Temp to Shared-Respond. As indicated in FIG. 4B, the Caching Agent 2 marks the cache line with the Shared-Respond state and all remaining caching agents (Caching Agent 3 in this example) change the cache line state from Shared-Temp to Shared.

Exclusive-Respond. According to another embodiment of the present invention, a novel cache coherency protocol includes an Exclusive-Respond state. A cache line is marked with the Exclusive-Respond state when a first caching agent acquires an exclusive copy of a cache line and the first caching agent has not modified the cache line. According to one embodiment of the present invention, the Exclusive-Respond state indicates that the first caching agent is responsible to drive the snoop response and provide the data to a requesting agent for the cache line.

In operation, when a caching agent performs a memory read and gets an Exclusive Snoop Response, the caching agent marks the cache line with the Exclusive-Respond state in its cache. If the cache line is not modified and another agent performs a memory read cycle, the caching agent drives the snoop response of either Shared response or Exclusive response. According to one embodiment of the invention, when the requested cache line is marked with the Exclusive-Respond state, the caching agent drives out the data in a Data Phase of a bus transaction. Thus, the main memory takes no action in providing the data to the requesting agent.

Memory bandwidth is often limited in a multiprocessor system and may create a bottleneck. To reduce the number of memory requests, the Exclusive-Respond state may be introduced to alleviate the bottleneck problem. In the above example embodiment, the data is provided by the snooping agent in the Exclusive-Respond state. As a result, a memory controller is no longer required to use its memory bandwidth to satisfy the request.

Figure 5:
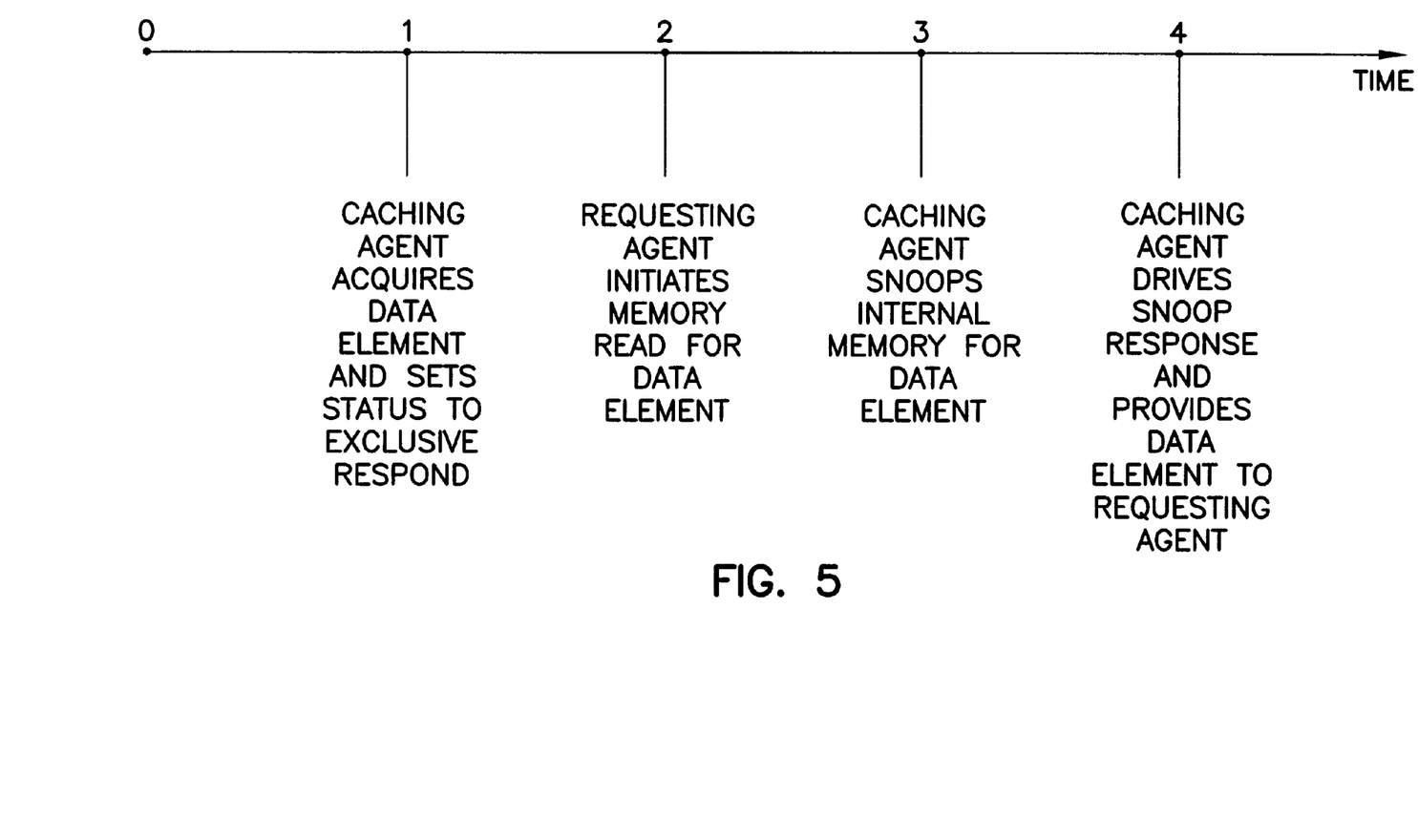
FIG. 5 is a time line showing actions taken by a requesting agent and a snooping agent to illustrate the Exclusive-Respond state according to one embodiment of the invention.

FIG. 5 is a time line showing actions taken by a requesting agent and a caching agent (i.e. a snooping agent) to illustrate the Exclusive-Respond state according to one embodiment of the invention. As shown at time "1" in FIG. 5, a caching agent acquires a data element and sets the status of the data element to Exclusive Respond. At time "2" in FIG. 5, a requesting agent initiates a memory read for the data element. At time "3" in FIG. 5, the caching agent snoops its internal memory for the data element requested by the requesting agent. At time "4" in FIG. 5, the caching agent drives the snoop response. Because the data element is marked as Exclusive Respond, the caching agent also provides the data element to the requesting agent according to one embodiment of the present invention. Thus, when a data element is present in a snooping agent's cache and the data element is in the Exclusive Respond state, the requesting agent receives the data element directly from the snooping agent rather than from main memory.

In an alternate embodiment, the same concept can be used in conjunction with the Shared-Respond state. For example, the Shared-Respond state described in the previous section may provide the data as well; the shared data is driven out by the snooping agent with the cache line in the Shared-Respond state. In this way, a cache line is always provided by a snooping agent containing the cache line.

In another example embodiment, a multiprocessor computer system with a directory or snoop filters can employ an Exclusive-Respond state to eliminate the requirement for a snoop phase in a bus protocol. The directory or the snoop filters of the multiprocessor system are generally included in the main memory to keep track of the cache lines being used by the processors. Each time a cache line is fetched from the main memory, the main memory marks the cache line in its directory or snoop filters accordingly. For example, a main memory knows a processor has referenced the cache line in an exclusive or a modified state when the cache line is marked as "Owned by Processor" in the main memory's directory. In this example embodiment, "main memory" refers to a main memory module that includes the memory controller and the memory itself.

Current multiprocessor system buses require a snoop phase for every memory bus cycle. A first purpose of the snoop phase is to maintain cache coherency in the system. A second purpose of the snoop phase is to abort a memory read operation when the most recent copy of the cache line exists in one of the processors (i.e., in a modified cache state). The snoop phase requires that every caching agent check its cache and respond accordingly. The snoop phase completes when all agents have responded. For this reason, the bus is often stalled by the snoop phase because one of the caching agents is unable to respond. The stalled bus cycle not only delays itself, but also holds up the subsequent cycles. As a result, the bus latency for the affected cycles increases and the system performance degrades.

In one embodiment, to eliminate a snoop phase of a bus protocol, a snoop result is attached to a data phase in the bus protocol. This satisfies the first purpose, as described above, by still providing a snoop result to maintain cache coherency in the system. Additionally, using the Exclusive-Respond state, together with the directory or snoop filter, assures that the snoop response and the data are driven by either the main memory or a processor exclusively. This satisfies the second purpose above which is to determine whether the main memory or one of the snooping agents will provide data to a requesting agent. For example, if a memory directory or a snoop filter keeps track of the exclusive and modified cache lines in a multiprocessor system, then the main memory no loner needs the snoop phase to determine whether or not the main memory is responsible for providing data to a requesting agent. According to an example embodiment employing a memory directory and an "Exclusive-Respond" state, if the main memory determines from its directory that a cache line is "Owned by a Processor," then the main memory will not participate in the data response. Instead, the owning processor with the cache line in the Exclusive-Respond state drives out a Shared, Exclusive, or Modified response and also provides the data to the requesting agent. In this example embodiment, the snoop response is attached to the data because this embodiment does not utilize a snoop phase. Thus, using a main memory directory and an Exclusive-Respond state of one embodiment of the invention, the snoop phase of a bus transaction is eliminated by moving the snoop response to the data phase of a bus protocol.

The above detailed description describes novel cache states for cache coherency protocols. First, with the novel Shared-Update state, all caching agents "listen" to the bus so that when a memory write cycle occurs, the caching agents update their cache lines. This eliminates the memory read cycles which would otherwise be required for the caching agents to acquire the new copy of the cache line from the memory.

Second, the novel Shared-Respond state confines the driving of the Shared response to one caching agent and, as a result, eliminates the simultaneous driving and releasing of the Shared Snoop Response by multiple caching agents. This allows the removal of the required dead clock for settling simultaneous driven snoop response signals (wired-OR) and simplifies the snoop response protocol requirements.

Third, with the novel Exclusive-Respond state, the data can be provided by the snooping agent instead of from the memory. The memory controller is no longer required to use its memory bandwidth for the requests. This can alleviate bottleneck problems when the memory bandwidth cannot satisfy the requests.

In the foregoing detailed description, computer systems and methods of maintaining cache coherency in a multiprocessor system have been described. Although specific embodiments have been illustrated and described herein, it will be appreciated that any arrangement which is calculated to achieve the same purpose may be substituted for the specific embodiment shown. For example, the computer system described may employ a PCI bus, or other types of buses for communication between caching agents. Furthermore, the computer system may contain an unlimited plurality of caching agents which employ various cache coherency protocols incorporating one or more of the novel cache states described above. Moreover, the computer system described may employ a plurality of system memory devices coupled to the bus. This application is intended to cover any adaptations or variations of the present invention. Therefore, it is intended that this invention be limited only by the claims and the equivalents thereof.

What is claimed is:

1. A multiprocessor computer system comprising:
 a plurality of cache memories to store a plurality of cache lines and state information for each one of the cache lines, the state information comprising data representing a first state selected from a first group consisting of a Shared-Update state, a Shared-Respond state and an Exclusive-Respond state, and the state information further comprising data representing one or more additional states selected from a second group consisting of a modified state, an exclusive stat; a shared state and an invalid state;
 a plurality of processors, at least one of the cache memories associated with each one of the plurality of processors;
 a system memory shared by the plurality of processors; and
 at least one bus interconnecting the system memory with the plurality of cache memories and the plurality of processors.

2. The multiprocessor computer system of claim 1 wherein the Shared-Update state indicates that each one of the plurality of cache memories with a same cache line update their copy of the same cache line during an external memory write cycle.

3. The multiprocessor computer system of claim 1 wherein the Shared-Respond state indicates that a single one of the cache memories is responsible to drive a shared snoop response signal when a copy of one of the cache lines is stored in at least two of the cache memories.

4. The multiprocessor computer system of claim 1 wherein the Exclusive-Respond state indicates that a first one of the cache memories is responsible to drive a snoop response signal and to provide one of the cache lines to a second one of the cache memories when the one of the cache lines is stored in be first one of the cache memories.

5. A method of maintaining cache coherency in a in a multiprocessor system, the method comprising:
 initiating, by a first processor, a write operation;
 writing data to a cache line in a fist cache memory of the first processor in response to the write operation;
 updating a shared system memory With the data written to the cache line in the fist cache memory of the first processor;
 updating a same cache line in a second cache memory of a second processor from data on a bus in response to update the shared system memory; and
 maintaining a Shared-Update state for the same cache line in the second cache memory of the second processor before and after the same cache line is updated.

6. The method of claim 5 wherein writing data to the cache line in the first cache memory comprises updating an existing cache line if a cache hit occurs.

7. The method of claim 5 wherein the method is implemented in place of a Shared state of a MESI protocol.

8. A method of maintaining consistency between data residing in a shared system memory and a plurality of cache memories, the method comprising:
 monitoring a bus for a memory write cycle to update a data element in a shared system memory, wherein the memory write cycle is generated in response to a first processor updating the data element stored in a first cache memory;
 updating the data element stored in a second cache memory using data on the bus for the memory write cycle,
 maintaining a Shared-Update state for the data element in the second cache memory before and after the data element is updated.

9. A method of maintaining cache coherency in a multi-processor system having a plurality of caching agents, the method comprising:

storing a copy of a cache line in two or more of the caching agents;

marking the copy of the cache line in a first one of be caching agents with a first state wherein the first state is a Shared-Respond state and the first state indicates that the first one of the caching agents is responsible to drive out a shared snoop response signal; and marking the copy of the cache line in each remaining caching agent with a second state wherein the second state is a Shared state according to a MESI protocol and each one of the remaining caching agents with the copy of the cache line in the second state do not drive the snoop response signal.

10. The method of maintaining cache coherency of claim 9 wherein the first state further indicates that the first one of the caching agent is responsible to provide the copy of the cache line to a requesting agent.

11. The method of maintaining cache coherency of claim 9 further comprising temporarily changing the second state of the copy of the cache line in each one of the remaining caching agents when the copy of the cache line in the first state is evicted by the first one of the caching agents.

12. The method of maintaining cache coherency of claim 11 wherein the second state is temporarily changed to a Shared-Temp state.

13. The method of maintaining cache coherency of claim 11 further comprising marking the copy of the cache line in one of the remaining caching agents with the first state so that the one of the remaining caching agents is responsible for driving out a shared snoop response signal.

14. The method of maintaining cache coherency of claim 13 further comprising marking the copy of the cache line in all other remaining caching agents with the second state wherein the caching agents with the copy of the cache line in the second state do not participate in driving the snoop response.

15. A method of maintaining cache coherency in a multiprocessor system having a plurality of caching agents, the method comprising:

storing a copy of a cache line in one of the plurality of caching agents; and marking the copy of the cache line in the one of the plurality of caching agents with a first state wherein the first state is an Exclusive-Respond state and the fit state indicates that the one of the plurality of caching agents is responsible for driving out a shared snoop response signal and providing the cache line to a requesting agent.

16. The method of maintaining coherency of claim 15 further comprising:

monitoring a bus for a memory read cycle initiated by the requesting agent for the copy of the cache line; and driving out the shared snoop response signal and providing the cache line to the requesting agent wherein the driving and providing is performed by the one of the plurality of caching agents with the copy of the cache line in the first state.

* * * * *

UNITED STATES PATENT AND TRADEMARK OFFICE
CERTIFICATE OF CORRECTION

PATENT NO. : 6,519,685 B1
DATED : February 11, 2003
INVENTOR(S) : Stephen S. Chang It is certified that error appears in the above-identified patent and that said Letters Patent is hereby corrected as shown below:

Title page,
Item [56], References Cited, U.S. PATENT DOCUMENTS, insert the following below "6,192,451 B1 * 2/2001 Arimilli et al. ........... 711/141":
-- OTHER PUBLICATIONS
Handy, J., "Maintaining Coherency in Cached Systems", *In: The Cache Memory Book- The Authoritative Reference on Cache Design*, Academic Press, San Diego, CA, pp. 123-186, (1998) --

Column 12,
Line 7, delete "stat;" after "exclusive" and insert -- state, -- therefor.
Line 33, delete "be" before "first" and insert -- the -- therefor.
Line 34, delete "in a" before "multiprocessor".
Line 39, delete "With" and insert -- with -- therefor.
Line 45, delete "update" and insert -- updating -- therefor.

Column 14,
Line 16, delete "fit" and insert -- first -- therefor.

Signed and Sealed this

Twenty-seventh Day of January, 2004

JON W. DUDAS
*Acting Director of the United States Patent and Trademark Office*